2 Sheets—Sheet 1.
E. D. BEAN.
Assignor to the CYCLIST'S AND SPORTSMAN'S GUN AND RIFLE COMPANY.
CANE GUN.
No. 10,910. Reissued Mar. 20, 1888.
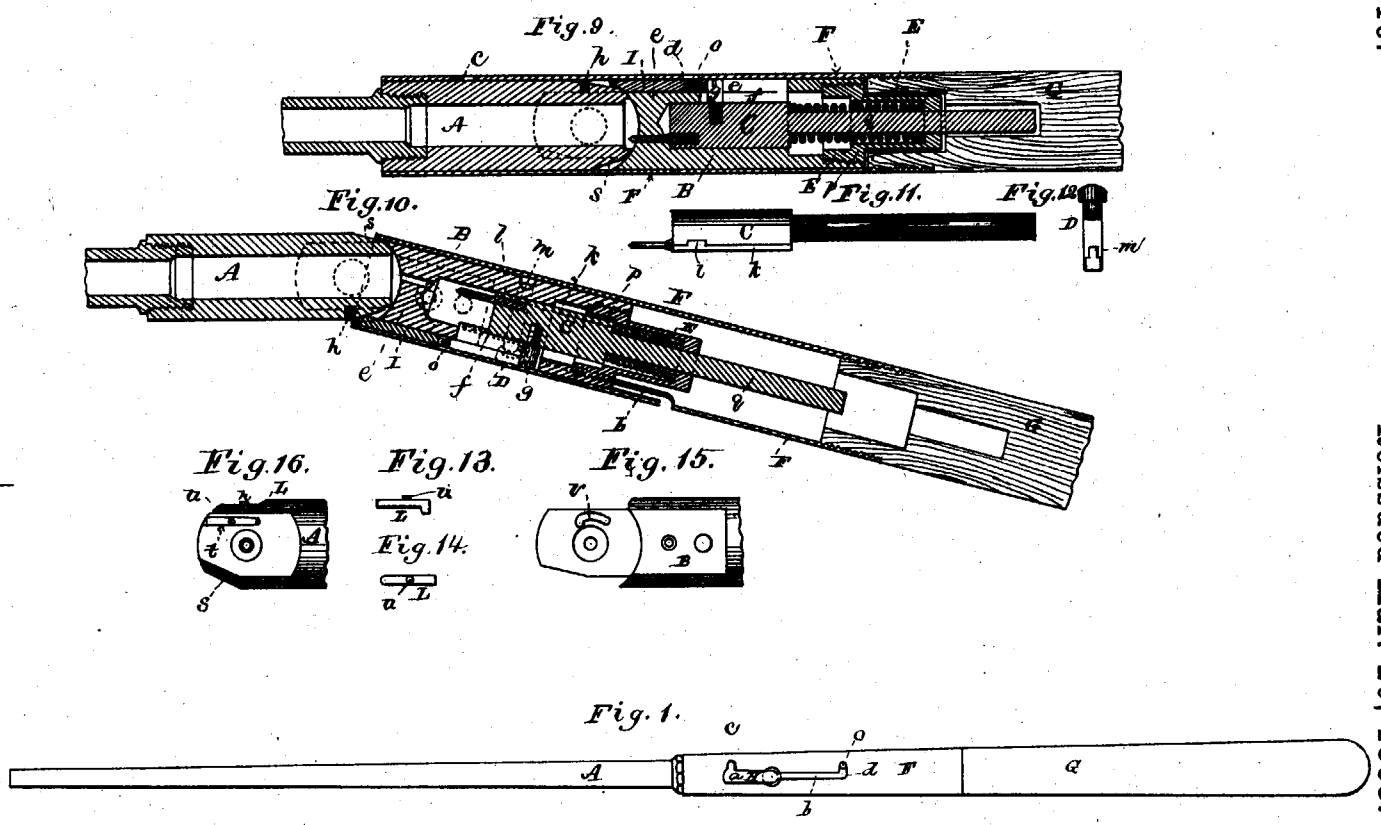
WITNESSES:
H. Brown.
F. Brawner.
INVENTOR:
E. D. Bean
by Wright, Brown & Crosby
Attys.
N. PETERS, Photo-Lithographer, Washington, D. C.

2 Sheets—Sheet 2.
E. D. BEAN.
Assignor to the CYCLIST'S AND SPORTSMAN'S GUN AND RIFLE COMPANY.
CANE GUN.
No. 10,910. Reissued Mar. 20, 1888.
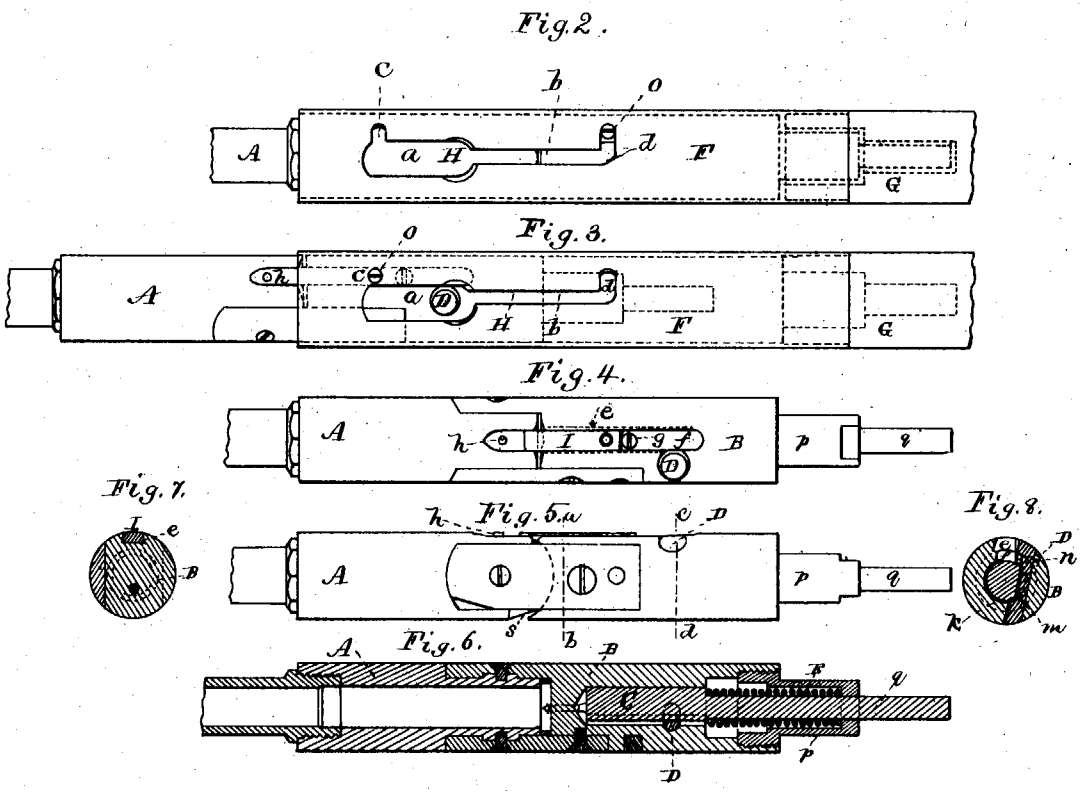
WITNESSES:
H. Brown.
F. Brauner.
INVENTOR:
E. D. Bean
by Wright Brown & Crosby.
Attys.
N. PETERS, Photo-Lithographer, Washington, D. C.

UNITED STATES PATENT OFFICE.

EDWARD DAVIS BEAN, OF BOSTON, MASSACHUSETTS, ASSIGNOR TO THE CYCLIST'S AND SPORTSMAN'S GUN AND RIFLE COMPANY, OF KITTERY, MAINE.

CANE-GUN.

SPECIFICATION forming part of Reissued Letters Patent No. 10,910, dated March 20, 1888.

Original No. 329,430, dated November 3, 1885. Application for reissue filed June 16, 1887. Serial No. 241,673.

*To all whom it may concern:*

Be it known that I, EDWARD DAVIS BEAN, of Boston, in the county of Suffolk, of the Commonwealth of Massachusetts, have invented a new and useful Improvement in Fire-Arms; and I do hereby declare the same to be described in the following specification and represented in the accompanying drawings, of which—

Figure 1 is a side view of my improved fire-arm as it appears when it is to be used as a cane or as the lower portion of a fishing-rod. Fig. 2 illustrates a portion of the same on an enlarged scale, with the parts in the same position as in Fig. 1. Fig. 3 shows the barrel as drawn forward or out of the sleeve and in the position ready for cocking the fire-arm. Fig. 4 is a top view; Fig. 5, a side view, and Fig. 6 a horizontal and longitudinal section of the rear portion of the barrel, with the breech-piece pivoted thereto. Fig. 7 is a transverse section on line *a b* of Fig. 5. Fig. 8 is a transverse section on line *c d* of Fig. 5. Fig. 9 is a vertical and longitudinal section of the parts shown in Figs. 4, 5, and 6, with the sleeve and a portion of the handle applied thereto. Fig. 10 is a vertical and longitudinal section of the parts shown in Fig. 9 as they appear when the fire-arm is in readiness to be discharged. Fig. 11 is a view of that side of the firing-pin which is next to the trigger. Fig. 12 is a view of that side of the trigger which is next to the firing-pin. Fig. 13 is a top view, and Fig. 14 a side view, of the cartridge-shell expeller. Fig. 15 is an inner side view of a portion of the breech-piece, showing the groove in which the stud projecting from the shell-expeller works. Fig. 16 is a view of the rear portion of the barrel, showing the groove which receives the shell-expeller.

The nature of the invention is duly defined in the claims hereinafter presented.

The article herein described embodying my said invention is designed for use either as a cane or a fire-arm, as occasion may require. The barrel shown at A is a breech-loading one, and is hinged to the breech-piece B, so as to be capable of being turned into an angle therewith to expose the open rear end of the said barrel and in manner to admit of the expulsion therefrom of a spent cartridge-shell or the introduction into the barrel at such end of it of a fresh charge or cartridge, there being to the barrel a device or mechanism, to be described, for so driving out of it at the proper time a spent cartridge-shell. The breech-piece B has within it the firing-pin C and its catch or trigger D. This firing-pin slides lengthwise within the breech-piece. It is provided with a spiral spring, E, adapted to it, as shown, for advancing it to cause it to bring up against the cartridge-shell for effecting an explosion of the fulminate of the charge thereof. The breech-piece is adapted to slide lengthwise within a sleeve or tube, F, projecting from a stick or handle, G, such sleeve having within it, as shown in Figs. 1 and 2, a long slot, H, a portion, *a*, of which, for about two-fifths of the length from the front end of the slot, is wider or about twice the width of the remaining part, *b*, in rear of such portion. Near the front end of the slot there is in the sleeve a notch, *c*, that opens laterally out of the slot, and there is also another such notch, *d*, at the rear end of the slot, the notch *d* leading laterally out of the slot.

Within the breech-piece B there is a groove, *e*, that is dovetailed in its cross-section to receive and support a bolt, I, capable of sliding lengthwise within the groove. Leading down from the said groove into the bore of the breech-piece is a slot, *f*, through which there extends from the firing-pin a stud or screw, *g*. When the sleeve is turned down into an obtuse angle with the barrel, in order to bring the stock or handle into a position for its rear end to be borne against the shoulder of a person for him to fire the gun, the bolt I is advanced underneath the rear part of the barrel against a stud or shoulder, *h*, projecting therefrom. The sleeve at the same time is formed so as to close over the barrel for a short distance at its rear end. The barrel, by bearing on the bolt with the stud *h* against the end of the bolt, is supported in its angular position with the stock. The sleeve, when encompassing the barrel for a short distance at its rear end, operates to prevent the escape of gas laterally from the joint of the barrel and the breech-piece. Lengthwise in the firing-pin is a groove, *k*, opening out of which, near its front end, is a notch, *l*. The trigger D is a headed bolt arranged with its shank extending crosswise of and alongside of the firing-pin and having a projection, *m*, to enter the groove *k* thereof, there being to the trigger and in the breech-piece a spring, *n*, to force the bolt into a cocked position. The head of the trigger, when the trigger projection *m* is in the groove *k*, is flush with the outer surface of the breech-piece. The said notch and projection are to hold the firing-pin cocked. By a person pressing his forefinger on the head of the trigger, when the firing-pin is cocked, the trigger may be moved inward, so as to carry its projection *m* out of the notch *l*, so as to allow the spring of the firing-pin to throw the pin forward. A stud or screw, *o*, projects upward from the bolt I, near its rear end, and into the slot H. The upper part of the stud *g* is directly in rear of the rear end of the bolt I. The sliding breech-piece has its bore closed at its rear end by a screw, *p*, through which the tail part *q* of the firing-pin slides.

When the parts are in positions for the firearm to be used as a cane, the barrel and breech-piece are to be in line with each other, and the sleeve is to be formed so as to surround both and extend in advance of their joint, in which case the sleeve is to be turned laterally on the breech-piece, so as to cause the stud *o* to enter the notch *d*. As the bolt I will then be against the stud *g*, not only will the sleeve be locked to the breech-piece, but will so extend beyond it and upon the barrel as to hold them in a right line with each other.

When the parts of the gun are to be brought into positions for the gun to be fired, the sleeve is first to be turned laterally on the breech-piece to bring the stud *o* into the slot of the sleeve. Next, the sleeve is to be drawn backward on the breech-piece and turned laterally, so as to cause the stud *o* to enter the notch *c*. Next, the sleeve is to be farther retracted on the breech-piece, in which case the sleeve will retract the bolt I and cause it to draw backward the firing-pin until it may be stopped at cock by the trigger. Next, the gun is to be turned transversely sufficiently to cause the bolt I to be on the under side of the breech-piece, and the barrel is to be turned down into an obtuse angle with the breech-piece, after which the sleeve is to be advanced on the latter and upon the rear end of the barrel, the bolt being carried with the sleeve until such bolt may bring up against the stud *h*, projecting down from the barrel. Such barrel is inclined, as shown at *s*, at the upper part of it, at its rear end, in order that when the barrel is in its angular position to the breech-piece the sleeve may pass over the inclined part, which, with the bolt, serves to hold the barrel inclined to the breech-piece and the sleeve and its handle. The gun, if previously loaded, may next be fired, which may be accomplished by pressing upon the head of the trigger, so as to force the trigger inward.

It will be observed, by reference to Figs. 9 and 10, that the firing-pin is eccentrically arranged within the breech-piece, and that the arrangement is such that the pin is not in a position to strike the fulminate of a cartridge in the barrel when the breech-piece and stock are in line with the barrel, but is in such position only when the breech-piece and stock are dropped at an angle to the barrel, as shown in Fig. 10. It is therefore possible to discharge the gun only when the stock is dropped.

To bring the barrel into a position for the cartridge-shell to be extracted or expelled from it and another or charged one to be substituted, the sleeve is to be drawn backward beyond the barrel, which may next be turned upward into nearly a right angle with the sleeve, so as to expose the rear end of the barrel.

The cartridge-shell expeller represented at L consists of a slide, a top view of which is shown in Fig. 13 and a side view in Fig. 14. It is arranged within a groove, *t*, in the barrel and so as to project directly in front of the head of the shell, and it has a stud, *u*, projecting from it into a groove, *v*, arranged obliquely in the next adjacent part of the breech-piece. On turning upward the barrel, the expeller, by means of the stud and groove, will be moved so as to force the shell backward a short distance to enable it to drop out of the barrel, or for the head of the shell to be taken hold of to advantage for the shell to be extracted from the barrel by the fingers of the gunner.

When the gun is to be used as a cane, the nozzle should be stopped by a proper stopper placed within and to project from it, which, preparatory to the gun being fired, shall be removed from it. Instead of such a stopper a fishing-pole stem may be inserted in the barrel, so as with the barrel to form a fish-pole, in order that while a person may be angling, and any game may appear near enough for him to shoot it, he can readily remove the stem from the barrel and use the gun for shooting the game.

I claim—

1. In a cane-gun, the combination of the barrel, the breech-piece hinged thereto and provided with the firing-pin arranged eccentrically therein, the stock having a sleeve which incloses and is adapted both to slide and rotate on the breech-piece, said sleeve serving when in its forward position to lock the barrel, breech-piece, and stock in line with each other, devices, substantially as described, whereby the sleeve may be engaged with the breech-piece, so that the backward movement of the sleeve on the breech-piece will retract the firing-pin, and a trigger in the breech-piece which engages the firing-pin, the eccentric arrangement of the firing-pin enabling it to act on the fulminate of a cartridge in the barrel only when the breech-piece and stock are dropped at an angle with the barrel, as set forth.

2. The combination of the gun-barrel, the hollow breech-piece jointed to the barrel and having the groove *e* and slot *f*, the firing-pin having the pin *g* and its operative spring arranged lengthwise within the breech, the trigger and its operative spring arranged transverse the firing-pin, the bolt I, having the pin *o*, and arranged in the groove *e*, the sleeve having a slot with a notch at each end, and the stock or handle secured to such sleeve, as set forth.

In testimony whereof I have signed my name to this specification, in the presence of two subscribing witnesses, this 17th day of May, A. D. 1887.

EDWARD DAVIS BEAN.

Witnesses:
C. F. BROWN,
ARTHUR W. CROSSLEY.